United States Patent Office 3,112,991
Patented Dec. 3, 1963

---

3,112,991
PROCESS FOR RECOVERY OF FLUORIDE-FREE COLUMBIUM AND TANTALUM PENTOXIDES FROM ORGANIC EXTRACTS
William B. Fisher, Eggertsville, N.Y., assignor to Union Carbide Corporation, a corporation of New York
No Drawing. Filed Mar. 28, 1960, Ser. No. 17,758
8 Claims. (Cl. 23—24)

This invention relates to a process for the production of columbium and/or tantalum pentoxides substantially free from fluorine contamination.

A common method for the recovery of tantalum and/or columbium values from solid starting materials such as their ores comprises solubilizing the metal values in an aqueous acid solution containing fluorides. The tantalum and columbium values are then either co-extracted from the aicd solution with an organic solvent and selectively stripped from the organic extract with an aqueous solution or they are selectively extracted from the acid solution with an organic solvent by carefully controlling the acid concentration and then stripping the metals from the individual organic extracts with an aqueous solution. In either process, aqueous hydrofluoric acid strip solutions of the tantalum and columbium values are produced which must be further processed to yield the pentoxides of tantalum or columbium.

The strip liquor obtained by the aqueous stripping of the organic extract contains the metal values as acid fluorides, e.g. $H_2CbF_7$ and $H_2TaF_7$, together with free aqueous hydrofluoric acid. Precipitates produced from these solutions contain a high percentage of fluoride material which along with the water of hydration must be removed before any of the metal values may be processed to elemental metal. Since the presence of fluorine lowers the metal recovery and fouls and corrodes reduction equipment and is undesirable for the sale of dried pentoxides a low fluorine content is essential. Many attempts have been made to remove the fluoride contamination. These methods generally involve special equipment and have proven either unsuccessful or extremely expensive and cumbersome to produce the minimum fluoride contamination specified by commercial standards.

Accordingly, it is an object of the present invention to provide a process for the production of columbium and/or tantalum pentoxides whereby the fluoride contamination may be reduced to less than 0.2 percent.

It is another object of this invention to provide a process for the production of a coarse precipitate of columbium and/or tantalum pentoxides substantially free from fluoride contamination.

Other objects and advantages of the present invention will be apparent from the subsequent disclosure and appended claims.

The objects are achieved by partially neutralizing the aforementioned aqueous strip liquid with ammonia prior to precipitation of the metal values therefrom. Following this procedure, the metal values may be readily obtained as pentoxides substantially free from fluoride contamination.

As used herein, the term "partially neutralized strip liquor" refers to strip liquor which has been treated with sufficient ammonia to neutralize any HF in excess of that theoretically necessary to furnish sufficient fluoride ion to form the pentafluorides ($CbF_5$ and/or $TaF_5$) of the metal values in the strip liquor but which has not been treated with sufficient ammonia to precipitate the metal values.

An aqueous acid fluoride solution of the columbium and/or tantalum values is obtained by any of the methods already known to the art such as treating ores of columbium and/or tantalum with aqueous hydrofluoric acid. Similarly, any of the well-known methods for extracting the metal values from the aqueous acid fluoride solution are employed. Suitable extracting solutions include, but are not limited to, methylisobutyl ketone, diethyl ketone, ethyl acetyl acetate and di-2-ethylhexyl acid phosphate.

The methods available for treating the organic extract to obtain the partially neutralized strip liquor may be broken down into two general groupings: (1) treatment of the organic extract to obtain the partially neutralized liquid directly and (2) treatment of the organic extract to obtain an aqueous strip liquor which is subsequently partially neutralized.

The treatment of the organic extract to produce the partially neutralized strip liquor directly may be effected by co-current or countercurrent means. If co-current treatment is desired, aqueous ammonia solution may be employed as the stripping solution. The weight rate of flow of the aqueous ammonia solution and the concentration of the ammonia should be co-ordinated and adjusted to the concentration of metal values in the organic extract according to standard stoichiometric calculations in order to obtain a strip liquor having the desired degree of neutralization. Countercurrent stripping with aqueous ammonia solution should be avoided; if fresh aqueous ammonia solution contacts organic extract which is partially neutralized, the metal values would tend to precipitate out of solution at the point of contact with the fresh aqueous ammonia solution.

If countercurrent stripping is desired, the necessary amount of ammonia should be added together with the pregnant organic extract to the first contact stage of the stripper. By countercurrently contacting the ammonia-containing pregnant organic extract with a suitable stripping solution such as water, the metal values may be effectively and efficiently recovered.

As was stated previously, the metal values may be stripped from the pregnant organic extract by standard means to produce a strip liquor which may then be partially neutralized according to the teachings of the present invention. This may be accomplished by adding gaseous ammonia to the aqueous strip liquor until the necessary degree of partial neutralization is obtained or by treating the aqueous strip liquor with sufficient aqueous ammonia solution to give the necessary degree of partial neutralization.

It should be apparent that various combinations of countercurrent and co-current treatments and of the extract treatments and strip liquor treatments may be employed to produce the partially neutralized strip liquor. Of these methods, however, the counttercurrent stripping wherein ammonia is added together with the pregnant organic extract to the first contact stage of the stripper is found to be most suitable. This method provides excellent transfer due to the conversion of the metal values to oxyfluorides which have high distribution co-efficients favoring the aqueous phase. In addition, partial neutralization to the extent of neutralizing the theoretical excess of HF reduces the heat load and reaction time in the subsequent precipitation.

The metal values may then be recovered from the partially neutralized strip liquor by dilution with water, by treatment with mineral acids, or alkali metal hydroxides, or by direct or reverse precipitation with aqueous ammonia solution.

The aforementioned methods for recovery of the metal values from the partially neutralized strip solution may be characterized by intermittent operation, non-uniform operational conditions, production of a fine grained precipitate (in some cases even geleatinous or contaminated with alkali metal values) together with corresponding difficult filtration and washing operations.

It has been found that if gaseous ammonia is employed for the precipitation a coarser and purer precipitate is obtained than by any of the other methods mentioned. When gaseous ammonia is employed in a continuous operation a coarse, pure precipitate is produced that is easily filtered and washed. The addition of gaseous ammonia should be in a continuous manner at a relatively slow contact rate while the pH of the solution is maintained at a value of about 8. The temperature should be maintained below about 50° C. to minimize losses of ammonia due to volatilization.

coarse material was obtained by gaseous $NH_3$-precipitation of a partially pre-neutralized stripped liquor.

The aqueous ammonia solution utilized to produce the fine precipitate was concentrated. However, dilute aqueous ammonia solution is also suitable for producing a coarse, granular precipitate. As employed herein dilute ammonia is 5 percent or less. Aqueous ammonia solution of about 1 percent concentration has been found to be quite suitable for this purpose.

Table II

| Type of Precipitate | Filtration | | | Washing | | | |
|---|---|---|---|---|---|---|---|
| | Pressure Drop In Hg | Volume, cc. | Time, Min. | Solution | Pressure Drop In Hg | Volume, cc. | Time, Min. |
| Fine | 25 | 370 | 7.0 | 1% $NH_3$ | 5 | 1,500 | 102 |
| Fine | 25 | 425 | 7.5 | 1% $NH_3$ | 20 | 1,500 | 20 |
| Coarse | 25 | 400 | 1.0 | 1% $NH_3$ | 10 | 1,000 | 2 |
| Coarse | 25 | 400 | 0.75 | 1% $NH_3$ | 10 | 1,600 | 3.5 |

The filtered precipitate is desirably washed with dilute aqueous ammonia solution. Any solution containing up to about 5 percent ammonia is suitable; however, the preferred concentration is between 0.5 and 2 percent.

To illustrate the process of the present invention an organic extract containing $H_2CbF_7$ and excess HF was treated with 28 percent aqueous ammonia solution to neutralize the excess HF. Five hundred milliliters of this partially neutralized aqueous solution of $H_2CbOF_5$ containing 19.8 grams of $Cb_2O_5$ were then contacted with gaseous ammonia for a period of three hours at 50° C. The resulting slurry was then poured into two six-inch diameter vacuum funnels to form two ⅛-inch cakes of the precipitated columbium values. The first cake was washed with 1000 cc. of water for 70 minutes and the second with 1000 cc. of aqueous 1 percent ammonia solution for 80 minutes. The washed solutions were introduced in a uniform and continuous manner from a perforated container. Both washed cakes were then dried at 100° C. for 16 hours. The dried, water-washed cake weighed 23.0 grams and contained 2.5 percent fluorine. The dried, ammonia-washed cake weighed 22.5 grams and contained 0.21 percent fluorine.

In another example of the invention the same solution of columbium values mentioned above was treated in an identical manner except that the period of water-washing was reduced to 25 minutes and the period of aqueous ammonia solution washing was reduced to 22 minutes. The dried, water-washed cake weighed 23.0 grams and contained 2.7 percent fluorine. The dried, aqueous ammonia solution washed cake weighed 21.0 grams and contained 0.13 percent fluorine.

The advantages obtainable by partial neutralization plus precipitation with gaseous ammonia may be illustrated by the data shown in Table I. Various precipitating reagents were employed. The character of the precipitate so produced and the relative rate of filtering are shown in the table.

Table I

| Precipitating Reagent | Type of Precipitate | Rate of Filtering |
|---|---|---|
| Preneutralization+Gaseous $NH_3$ | Coarse | Fast. |
| Mineral Acid ($H_2SO_4$) | Gelatinous | Slow. |
| KOH Solution | K-Salt Contaminated | Slow. |
| Liquid $NH_3$ | Very Fine | Slow. |
| Water Only | Fine | Slow. |

The advantages of obtaining a coarse precipitate may be readily seen from the data in Table II. The fine material described in the table was obtained by stripping an extract with water and subsequently precipitating the stripped liquor with aqueous ammonia solution. The

What is claimed is:

1. In a process for the recovery of a pentoxide of at least one metal selected from the group consisting of columbium and tantalum from an organic extract containing an acid fluoride of said selected metal and hydrogen fluoride, the improvement which comprises treating said acid fluoride of said selected metal with water and ammonia in an amount sufficient to neutralize any HF in excess of that theoretically necessary to form the pentafluoride of said selected metal without precipitation of the metal values and to produce an aqueous solution of the selected metal values; separating said aqueous solution from the organic extract; and precipitating said selected metal values from the aqueous solution.

2. The improvement in accordance with claim 1 wherein the precipitation of the selected metal values from the aqueous solution is effected by adding gaseous ammonia thereto in a continuous manner while maintaining the pH of the solution at about 8.

3. An improvement in accordance with claim 2 wherein the precipitate is washed with dilute aqueous ammonia solution.

4. The improvement in accordance with claim 1 wherein the precipitation of the selected metal values from the aqueous solution is effected by adding dilute aqueous solution of ammonia thereto in a continuous manner while maintaining the pH of the solution at about 8.

5. An improvement in accordance with claim 4 wherein the precipitate is washed with dilute aqueous ammonia solution.

6. In a process for the recovery of a pentoxide of at least one metal selected from the group consisting of columbium and tantalum from an organic extract containing an acid fluoride of said selected metal and hydrogen fluoride the improvement which comprises contacting a stream of said organic extract with a co-current stream of aqueous ammonia solution, the weight rate of flow and concentration of said aqueous ammonia solution being such as to provide a partially neutralized strip liquor containing the metal values without precipitation of the metal values; separating the partially neutralized aqueous strip liquor from the organic extract; and precipitating said selected metal values from the aqueous solution.

7. In a process for the recovery of a pentoxide of at least one metal selected from the group consisting of columbium and tantalum from an organic extract containing an acid fluoride of said selected metal and hydrogen fluoride the improvement which comprises treating said acid fluoride of said selected metal with gaseous ammonia in an amount sufficient to neutralize any HF in excess of that theoretically necessary to form the pentafluoride of said selected metal without precipitation of the metal values; intimately contacting the resulting partially neutralized organic extract with water whereby at least a substantial portion of said selected metal values are transferred to the water; separating the resulting aqueous solution from the organic extract; and precipitating said selected metal values from the aqueous solution.

8. An improvement in accordance with claim 7 wherein the partially neutralized organic extract is contacted with water in a countercurrent manner.

References Cited in the file of this patent

UNITED STATES PATENTS

| | | |
|---|---|---|
| 2,819,945 | Ruhoff et al. | Jan. 14, 1958 |
| 2,871,092 | Wilhelm et al. | Jan. 27, 1959 |
| 2,950,966 | Foos | Aug. 30, 1960 |

OTHER REFERENCES

Stevenson et al.: "Separation of . . . Extraction," in Analytical Chemistry, vol. 25, No. 10, October 1953, pages 1517–1519. (Copy in Sci. Lib.)

Werning et al.: "Industrial and Engineering Chemistry," vol. 46, No. 4, April 1954, pages 644–652. (Copy in Sci. Lib.)

Foos et al.: "U.S. Atomic Energy Commission Report," ISC-694, July 1954, 71 pages (pages 6, 9, 27, 31–36, 45–49 and 67–69 of particular interest). (Available, Office of Technical Services, Department of Commerce, 45 cents.)

Fieser et al.: "Organic Chemistry," 2nd ed., D. C. Heath and Co., Boston, 1950, pages 220–224. (Copy in Sci. Lib. QD251F5.)